(12) United States Patent
Wu et al.

(10) Patent No.: US 10,976,851 B2
(45) Date of Patent: Apr. 13, 2021

(54) TOUCH DISPLAY PANEL, METHOD FOR DRIVING THE SAME, AND DISPLAY DEVICE

(71) Applicants: Chongqing BOE Optoelectronics Technology Co., Ltd., Chongqing (CN); BOE Technology Group Co., Ltd., Beijing (CN)

(72) Inventors: Junhui Wu, Beijing (CN); Xin Bi, Beijing (CN); Jiandong Guo, Beijing (CN); Xun Pu, Beijing (CN); Zhongshan Wu, Beijing (CN)

(73) Assignees: Chongqing BOE Optoelectronics Technology Co., Ltd., Chongqing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/654,124

(22) Filed: Oct. 16, 2019

(65) Prior Publication Data
US 2020/0218388 A1  Jul. 9, 2020

(30) Foreign Application Priority Data
Jan. 4, 2019  (CN) .......................... 201910007261.9

(51) Int. Cl.
*G06F 3/041* (2006.01)
*G06K 9/00* (2006.01)
*G09G 3/20* (2006.01)

(52) U.S. Cl.
CPC .......... *G06F 3/0412* (2013.01); *G06F 3/0416* (2013.01); *G06K 9/00006* (2013.01); *G09G 3/2074* (2013.01)

(58) Field of Classification Search
None
See application file for complete search history.

(56) References Cited

U.S. PATENT DOCUMENTS

| 2014/0176494 A1* | 6/2014 | Huang ................ G02F 1/13394 345/174 |
| 2015/0015517 A1 | 1/2015 | Zhao et al. |

(Continued)

FOREIGN PATENT DOCUMENTS

| CN | 103926736 A | 7/2014 |
| CN | 104808886 A | 7/2014 |

(Continued)

OTHER PUBLICATIONS

Office Action for corresponding Chinese Application 201910007261.9 dated Aug. 19, 2020.

*Primary Examiner* — Aneeta Yodichkas
(74) *Attorney, Agent, or Firm* — Arent Fox LLP; Michael Fainberg (57) ABSTRACT

A touch display panel, a method for driving the same, and a display device. The touch display panel includes: an array substrate including pixel zones in an array, control signal lines at gaps between rows of pixel zones, and acquisition signal lines at gaps between columns of pixel zones, and insulated from control signal lines, sub-pixels, line recognition control transistors, and line recognition electrodes at gaps between the sub-pixels are arranged in pixel zones; line recognition control transistors have gates connected the control signal line, sources connected with line recognition electrodes, and drains connected with acquisition signal line; control signal lines provide line recognition control transistors with a control signal; and the acquisition signal lines provide the line recognition electrodes with a line recognition signal through the line recognition control transistors, and receive a signal carrying line information transmitted by the line recognition electrodes through the line recognition control transistors.

17 Claims, 6 Drawing Sheets

(56) References Cited

U.S. PATENT DOCUMENTS

| | | | |
|---|---|---|---|
| 2016/0048717 A1 | 2/2016 | Yang et al. | |
| 2017/0124381 A1 | 5/2017 | Liu et al. | |
| 2017/0147850 A1 | 5/2017 | Liu et al. | |
| 2017/0192564 A1* | 7/2017 | Li | G06F 3/044 |
| 2017/0371213 A1* | 12/2017 | Wang | G02F 1/1362 |
| 2019/0265564 A1* | 8/2019 | Li | G09G 3/2003 |

FOREIGN PATENT DOCUMENTS

| | | |
|---|---|---|
| CN | 104200768 A | 12/2014 |
| CN | 104216578 A | 12/2014 |
| CN | 104881196 A | 9/2015 |
| CN | 107479763 A | 12/2017 |
| CN | 107562270 A | 1/2018 |
| CN | 108398822 A | 8/2018 |
| JP | 5196187 B2 | 5/2013 |

* cited by examiner

TOUCH DISPLAY PANEL, METHOD FOR DRIVING THE SAME, AND DISPLAY DEVICE

CROSS-REFERENCE TO RELATED APPLICATION

This application claims priority of Chinese Patent Application No. 201910007261.9, filed on Jan. 4, 2019, which is hereby incorporated by reference in its entirety.

FIELD

The present disclosure relates to the field of display technologies, and particularly to a touch display panel, a method for driving the same, and a display device.

BACKGROUND

As smart mobile phones are being popularized, display devices with a high screen to panel ratio have been increasingly favored. A fingerprint recognition function can be built in a display screen to thereby dispense with such a space on the front face of a mobile phone that would otherwise have been occupied by a fingerprint recognition module, so as to greatly improve a high screen to panel ratio.

SUMMARY

Some embodiments of the disclosure provide a touch display panel including: a plurality of pixel zones arranged in an array, a plurality of control signal lines arranged at gaps between rows of pixel zones, and a plurality of acquisition signal lines arranged at gaps between columns of pixel zones, and insulated from the control signal lines, wherein:
 a plurality of sub-pixels, line recognition control transistors, and line recognition electrodes arranged at gaps between the sub-pixels are arranged in the pixel zones, and the line recognition control transistors have gates connected with the control signal line, sources connected with the line recognition electrodes, and drains connected with the acquisition signal line;
 the control signal lines are configured to provide the line recognition control transistors with a control signal; and
 the acquisition signal lines are configured to provide the line recognition electrodes with a line recognition signal through the line recognition control transistors, and to receive a signal carrying line information transmitted by the line recognition electrodes through the line recognition control transistors.

In a possible implementation, in the touch display panel above according to embodiments of the disclosure, the line recognition electrodes include first sub-electrodes arranged at the gaps between the rows of sub-pixels, and second sub-electrodes arranged at gaps between the columns of sub-pixels, and electrically connected with the first sub-electrode, wherein:
 one first sub-electrode is arranged at a row gap between two adjacent pixel zones, and one second sub-electrode is arranged at a column gap between two adjacent pixel zones.

In a possible implementation, in the touch display panel above according to embodiments of the disclosure, a length of the first sub-electrode in the pixel zones is less than a sum of lengths of the sub-pixels in a row direction, and a length of the second sub-electrode is identical to a length of the sub-pixels in a column direction.

In a possible implementation, in the touch display panel above according to embodiments of the disclosure, the touch display panel further includes scan signal lines arranged at gaps between the rows of pixel zones; and
 the scan signal lines are reused as the control signal lines.

In a possible implementation, in the touch display panel above according to embodiments of the disclosure, the touch display panel further includes data signal lines arranged at gaps between the columns of sub-pixels; and
 the data signal lines are arranged at a layer same as a layer at which the acquisition signal lines are arranged, and the data signal lines and the acquisition signal lines in a same pixel zone are arranged at different gaps between columns of sub-pixels.

In a possible implementation, in the touch display panel above according to embodiments of the disclosure, the touch display panel further includes black matrixes; and
 orthographic projections of the black matrixes onto the array substrate cover orthographic projections of the line recognition electrodes, the control signal lines, the acquisition signal lines, and the line recognition control transistors onto the array substrate.

Based upon the same inventive idea, some embodiments of the disclosure further provide a display device including the touch display panel above.

Correspondingly some embodiments of the disclosure further provide a method for driving the touch display panel above, the method including:
 applying a control signal to the control signal lines line by line;
 applying a line recognition signal to the line recognition electrodes through the acquisition signal lines; and
 detecting a feedback signal of the line recognition electrodes acquired through the acquisition signal lines to recognize a line.

In a possible implementation, in the driving method above according to embodiments of the disclosure, the applying the line recognition signal to the line recognition electrodes through the acquisition signal lines includes:
 after the control signal is applied to one control signal line, applying the line recognition signal to the control signal line through the acquisition signal lines of a column matching with the control signal line.

In a possible implementation, in the driving method above according to embodiments of the disclosure, the detecting the feedback signal of the line recognition electrodes acquired through the acquisition signal lines to recognize a line includes:
 detecting the feedback signal of the line recognition electrodes acquired through the acquisition signal lines, and determining a touch position;
 determining acquisition signal lines to be detected again, according to the touch position;
 applying a line recognition signal again to determined acquisition signal lines; and
 detecting a feedback signal of the determined acquisition signal lines again, and recognizing a line according to a detection result.

In a possible implementation, in the driving method above according to embodiments of the disclosure, the determining the acquisition signal lines to be detected again, according to the touch position includes:
 determining first M columns of acquisition signal lines starting with the touch position, and last N columns of acquisition signal lines succeeding to the touch position as the acquisition signal lines to be detected again, wherein M and N are positive integers.

In a possible implementation, in the driving method above according to embodiments of the disclosure, before the control signal is applied to the control signal lines line by line, the method further includes: receiving a fingerprint recognition request.

DETAILED DESCRIPTION OF THE EMBODIMENTS

Particular implementations of the touch display panel, the method for driving the same, and the display device according to the embodiments of the disclosure will be described below in details with reference to the drawings. It shall be noted that the embodiments described in this specification are only a part but not all of the embodiments of the disclosure; and the embodiments of the disclosure, and the features in the embodiments can be combined with each other unless they conflict with each other. Moreover based upon the embodiments here of the disclosure, all the other embodiments which can occur to those ordinarily skilled in the art without any inventive effort shall fall into the scope of the disclosure.

The shapes and sizes of respective layers in the drawings are not intended to reflect their real proportions in the touch display panel, but only intended to illustrate the disclosure of the disclosure.

As illustrated in FIG. 1 to FIG. 4, a touch display panel according to some embodiments of the disclosure includes: an array substrate including a plurality of pixel zones 101 arranged in an array, a plurality of control signal lines 102 located at gaps between respective rows of pixel zones 101, and a plurality of acquisition signal lines 103 located at gaps between respective columns of pixel zones 101, and insulated from the control signal lines 102.

Figure 1:
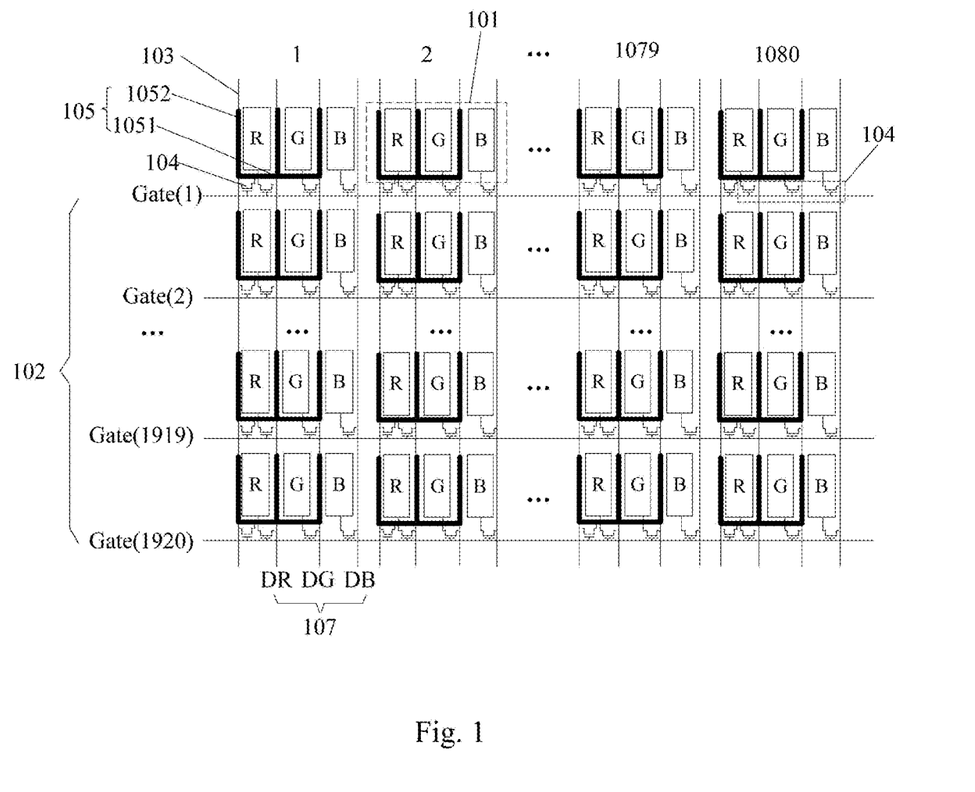
FIG. 1 is a first schematic structural diagram of a touch display panel according to some embodiments of the disclosure.

A plurality of sub-pixels (e.g., a red sub-pixel R, a green sub-pixel G, and a blue sub-pixel B in FIG. 1), line recognition control transistors 104, and line recognition electrodes 105 located at gaps between the respective sub-pixels are arranged in each pixel zone 101, where the line recognition control transistors 104 have gates connected with the control signal line 102, sources connected with the line recognition electrodes 105, and drains connected with the acquisition signal line 103, and optionally the sources of the line recognition control transistors 104 can be connected with the line recognition electrodes 105 through through-hole.

The control signal lines 102 are configured to provide the line recognition control transistors 104 with a control signal.

The acquisition signal lines 103 are configured to provide the line recognition electrodes 105 with a line recognition signal through the line recognition control transistors 104, and to receive a signal carrying line information transmitted by the line recognition electrodes 105 through the line recognition control transistors 104.

In the touch display panel above according to embodiments of the disclosure, the line recognition control transistors 104, the line recognition electrodes 105, the acquisition signal line 103, and the control signal lines 102 are integrated in the touch display panel to thereby recognize a line (e.g., a fingerprint) so as to improve a screen to panel ratio.

Figure 2:
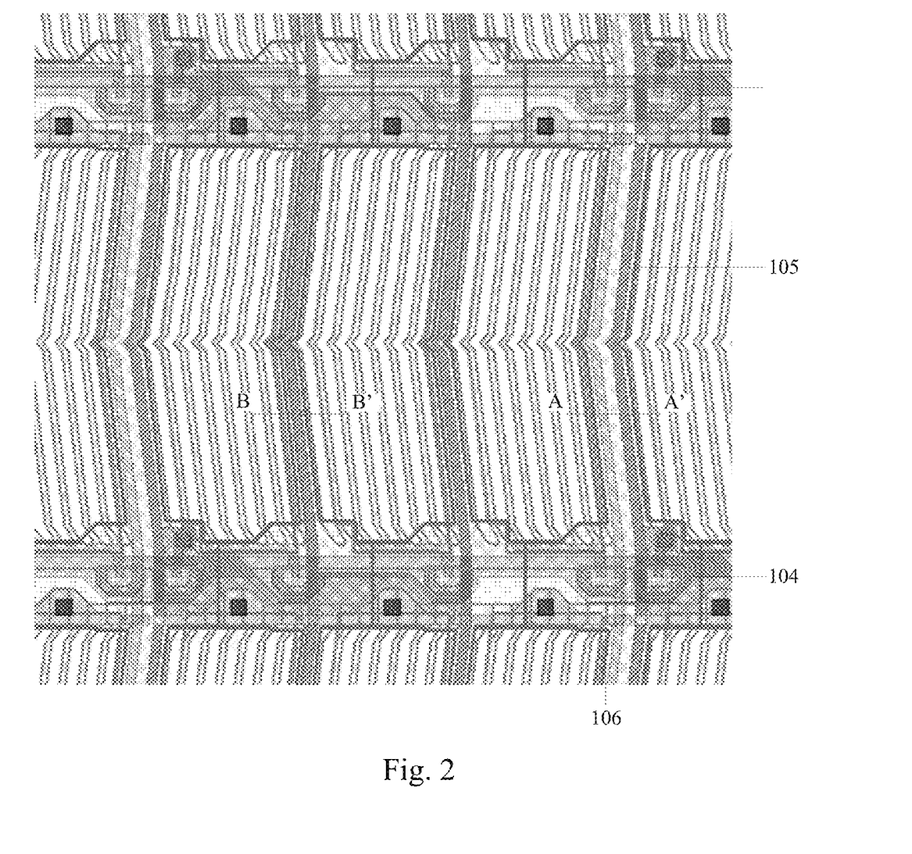
FIG. 2 is a second schematic structural diagram of the touch display panel according to some embodiments of the disclosure.

It shall be noted that in the touch display panel above according to the embodiment of the disclosure, as illustrated in FIG. 1 and FIG. 2, the touch display panel generally further includes pixel transistors 106, and in order to simplify a fabrication process, and to lower a production cost, respective layers of the line recognition control transistors 104 can be arranged respectively at the same layers as their corresponding layers of the pixel transistors 106.

In a particular implementation, in the touch display panel above according to the embodiment of the disclosure, as illustrated in FIG. 1, the line recognition electrodes 105 include first sub-electrodes 1051 located at the gaps between respective rows of sub-pixels, and second sub-electrodes 1052 located at gaps between respective columns of sub-pixels, and electrically connected with the first sub-electrode.

One first sub-electrode 1051 is arranged at a row gap between two adjacent pixel zones 101, and one second sub-electrode 1052 is arranged at a column gap between them.

Stated otherwise, in the touch display panel above according to the embodiment of the disclosure, as illustrated in FIG. 1, the line recognition electrodes 105 are shaped like " 凵 ", and the line recognition electrodes 105 in the adjacent pixel zones 101 are separate from each other.

In a particular implementation, in order to guarantee the precision of line recognition, in the touch display panel above according to embodiments of the disclosure, as illustrated in FIG. 1, the length of the first sub-electrode 1051 in each pixel zone 101 is less than the sum of the lengths of the respective sub-pixels in the row direction, and the lengths of the second sub-electrodes 1052 are the same as the lengths of the sub-pixels in the column direction, which are approximately 30 μm to 150 μm.

In a particular implementation, in the touch display panel above according to the embodiment of the disclosure, as illustrated in FIG. 1, the touch display panel generally further includes scan signal lines Gate(1), Gate(2), . . . , and Gate(1920) located at the gaps between the respective rows of pixel zones 101, and in order to simplify the fabrication process, the scan signal lines Gate(1), Gate(2), ..., and Gate(1920) can be reused as the control signal lines 102, so that a scan signal provided for the scan signal lines by a gate driving circuit in the related art can be reused as a control signal.

Of course, in a particular implementation, the scan signal lines and the control signal lines 102 can alternatively be formed separately, although embodiments of the disclosure will not be limited thereto, and when the scan signal lines and the control signal lines 102 are formed separately, the scan signal lines and the control signal lines 102 can be formed in the same patterning process, that is, the scan signal lines and the control signal lines 102 are arranged at the same layer.

In a particular implementation, in the touch display panel above according to embodiments of the disclosure, as illustrated in FIG. 1, the touch display panel generally further includes data signal lines 107 located at the gaps between the respective columns of sub-pixels, and optionally the data signal lines 107 can include first data signal lines DR electrically connected with the red sub-pixels R, second data signal lines DG electrically connected with the green sub-pixels G, and third data signal lines DB electrically connected with the blue sub-pixels B.

In order to simplify the fabrication process, and to guarantee a lightweight and thinned design, the data signal lines 107 can be arranged at the same layer as the acquisition signal lines 103, and in order to avoid signals on the data signal lines 107, and signals on the acquisition signal lines 103 from interfering with each other, the respective data signal lines 107 (e.g., the first data signal lines DR, the second data signal lines DG and the third data signal lines DB as illustrated in FIG. 1) in the same pixel zone 101, and the acquisition signal lines 103 can be arranged at the gaps between different columns of the respective sub-pixels.

Figure 3:
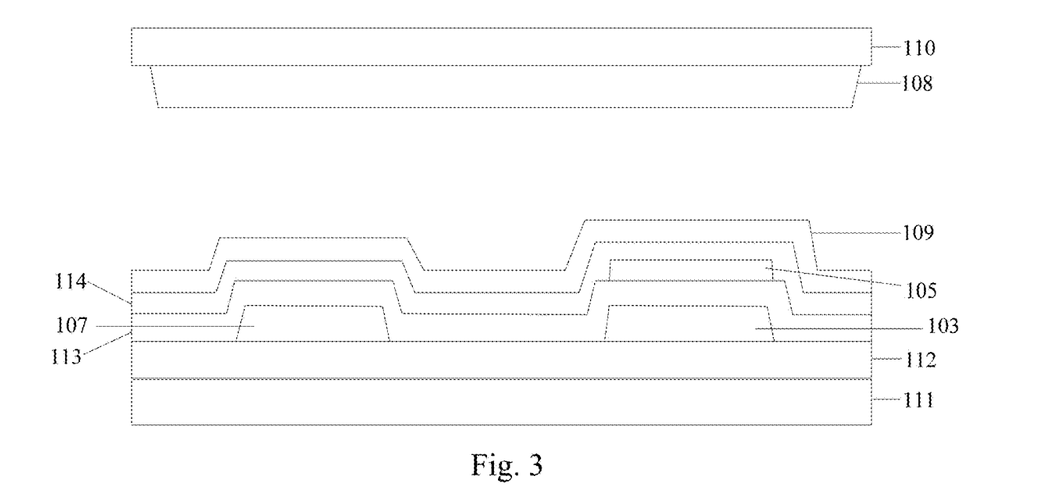
FIG. 3 is a schematic structural diagram of the touch display panel as illustrated in FIG. 2 in a sectional view along AA'.
Figure 4:
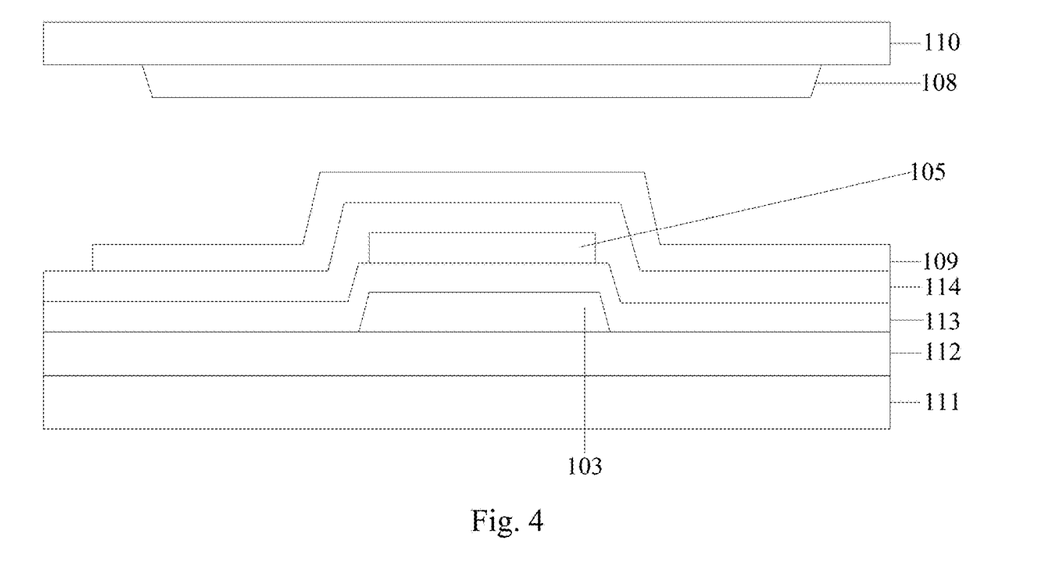
FIG. 4 is a schematic structural diagram of the touch display panel as illustrated in FIG. 2 in a sectional view along BB'.

In a particular implementation, in the touch display panel above according to the embodiment of the disclosure, as illustrated in FIG. 3 and FIG. 4, the touch display panel generally further includes a black matrix 108.

An orthographic projection of the black matrix 108 onto the array substrate cover orthographic projections of the line recognition electrodes 105, the control signal lines 102, the acquisition signal lines 103, and the line recognition control transistors 104 onto the array substrate, so that the line recognition electrodes 105, the control signal lines 102, the acquisition signal lines 103, and the line recognition control transistors 104 will not hinder an image from being displayed normally.

In some embodiments, as illustrated in FIG. 2 and FIG. 3, the touch display panel above according to the embodiment of the disclosure can further include pixel electrodes (not illustrated), common electrodes 109, an upper substrate 110, a lower substrate 111, a gate insulation layer 112, a first insulation layer 113 for isolating the acquisition signal lines 103 from the line recognition electrodes 105, and second insulation layers 114 for isolating the line recognition electrodes 105 from the common electrodes 109.

Figure 5:
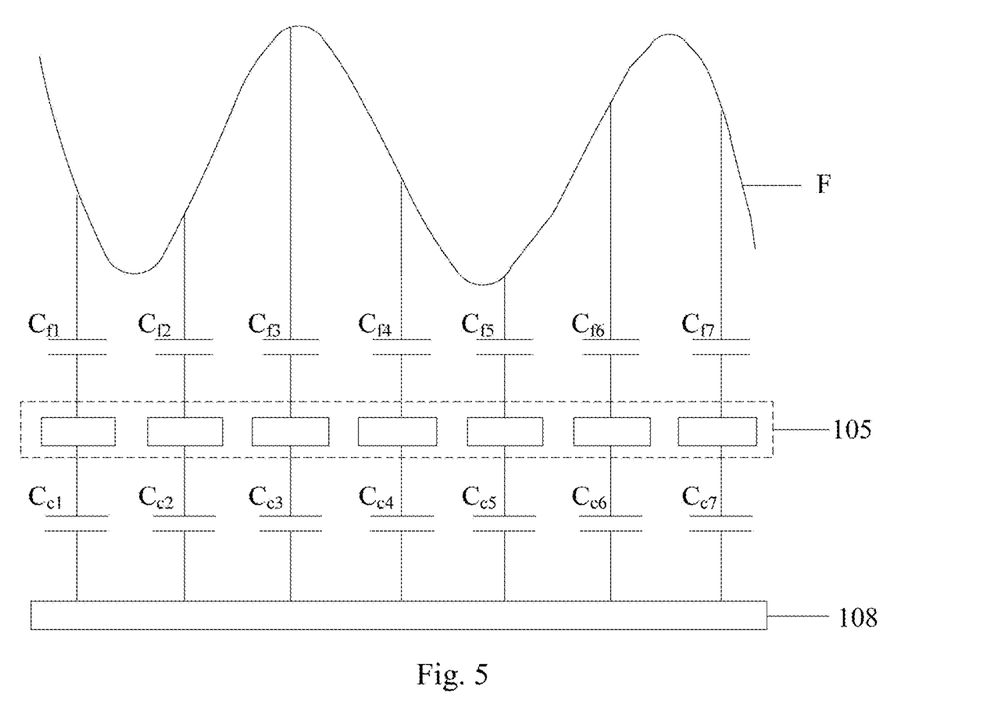
FIG. 5 is a schematic principle diagram of line recognition in the touch display panel according to some embodiments the disclosure.

As can be appreciated, in order to recognize a finger in the touch display panel above according to embodiments of the disclosure, as illustrated in FIG. 5, there is the same capacitance of a capacitor $C_{cn}$ between each line recognition electrode 105 and the common electrode 109, and there are different distances between different areas of a fingerprint of a finger touching the touch display panel, and the line recognition electrode 105, so there are such different capacitances of corresponding capacitors $C_{fn}$ that reflect the shape of the fingerprint in the pixel zone 101 including the line recognition electrode 105, and after the entire zone of the finger is scanned, the entire fingerprint can be acquired. In a particular application, the capacitance of the capacitor $C_{cn}$ can be determined according to a voltage difference generated when the line recognition electrode 105 is charged and discharged.

Figure 6:
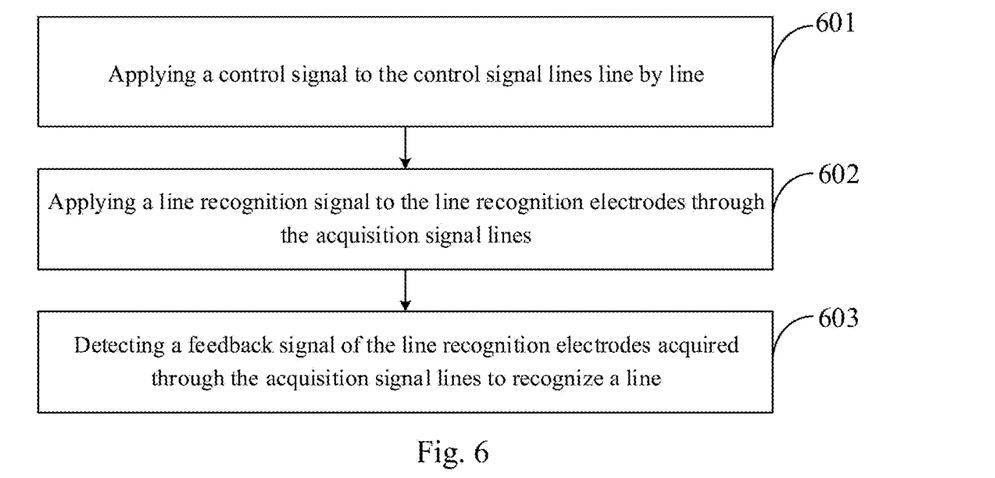
FIG. 6 is a flow chart of a method for driving the touch display panel according to some embodiments of the disclosure.

Correspondingly, some embodiments of the disclosure further provide a method for driving the touch display panel above, and as illustrated in FIG. 6, the method includes the following steps:

the step S601 is to apply a control signal to the respective control signal lines line by line;

the step S602 is to apply a line recognition signal to the line recognition electrodes on the acquisition signal lines; and the step S603 is to detect a feedback signal of the line recognition electrodes acquired on the acquisition signal lines to recognize a line.

Figure 7:
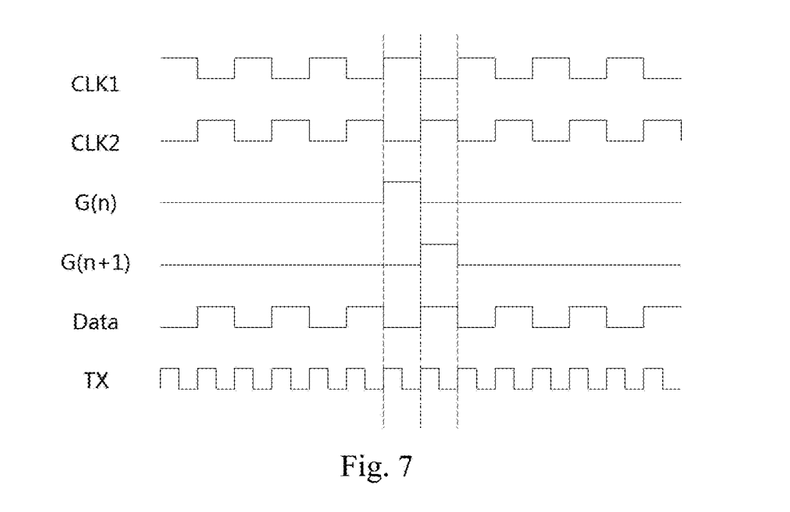
FIG. 7 is an operating timing diagram of the touch display panel according to some embodiments of the disclosure.

FIG. 7 illustrates a scan process of the entire fingerprint, and a display process of the touch display panel, where there are two clock signals (CLK) as illustrated, but there may alternatively be another number of clock signals (e.g., 4, 6, or 8 clock signals). When the n-th row of scan signal line (i.e., control signal line 102) in the touch display panel is enabled, all of the line recognition control transistors 104 and the pixel transistors 106 in that row are switched on. A data signal Data is transmitted to the sub-pixels on the data signal lines 107 to thereby perform a normal display function. All the line recognition electrodes 105 are charged and discharged (using a Tx signal in FIG. 7) on the acquisition signal lines 103, and a detection integrated circuit IC reads the capacitance of the capacitor $C_{fn}$ in the current row on the acquisition signal lines 103. In a period of time for which the line recognition control transistors 104 are switched on, the line recognition electrodes 105 shall be charged and discharged at least once (once in FIG. 7) on the acquisition signal lines 103. While the scan signal lines (i.e., the control signal lines 102) are being scanned line by line, the IC reads the capacitances of the capacitors $C_{fn}$ line by line, and after all the scan signal lines (i.e., the control signal lines 102) are scanned, the entire fingerprint is acquired.

However, in view of a power loss and a corresponding capacity of the IC (it may be rather difficult for the current IC to both receive and read capacitance data fed back on more than 1000 columns of acquisition signal lines 103), in the fingerprint recognition process above, in order to guarantee the corresponding capacity of the IC, and to lower the power loss of the IC, in the driving method above according to the embodiment of the disclosure, the step S602 of applying the line recognition signal to the line recognition electrodes on the acquisition signal lines can particularly include:

after the control signal is applied to respective one of the control signal lines, applying the line recognition signal to the control signal line on the acquisition signal lines of the column matching with the control signal line, that is, after the control signal is applied to each control signal line, only a part of the acquisition signal lines operate, and cooperates with the control signal line to perform the line recognition function to thereby reduce the number of IC channels, lower the power loss of the IC, and improve the efficiency.

In a particular implementation, in order to guarantee the corresponding capacity of the IC, and to lower the power loss of the IC, in the driving method above according to the embodiment of the disclosure, the step S603 of detecting the feedback signal of the line recognition electrodes acquired on the acquisition signal lines to recognize a line can include:
  detecting the feedback signal of the line recognition electrodes acquired on the acquisition signal lines, and determining a touch position;
  determining acquisition signal lines to be detected again, according to the touch position;
  applying a line recognition signal again to the determined acquisition signal lines; and
  detecting a feedback signal of the determined acquisition signal lines again, and recognizing a line according to a detection result.

Stated otherwise, after the touch position is determined, the line recognition signal is applied again to the zone including the touch position to thereby recognize a fingerprint, so that only a part of the acquisition signal lines operate in the line recognition process to thereby reduce the number of IC channels, lower the power loss of the IC, and improve the efficiency.

In a particular implementation, in the driving method above according to the embodiment of the disclosure, in order to acquire all the fingerprint information, the step of determining the acquisition signal lines to be detected again, according to the touch position can include:
  determining the first M columns of acquisition signal lines starting with the touch position, and the last N columns of acquisition signal lines succeeding to the touch position as the acquisition signal lines to be detected again, where M and N are positive integers.

In a particular implementation, in the driving method above according to the embodiment of the disclosure, before the control signal is applied to the respective control signal lines line by line in the step S601, the method can further include the step of receiving a fingerprint recognition request, that is, a fingerprint is recognized upon reception of the fingerprint recognition request which is a trigger instruction.

In order to better understand the fingerprint recognition function according to embodiments of the disclosure, the touch display panel with the resolution of 1080×1920 will be described below in details by way of an example.

Figure 8:
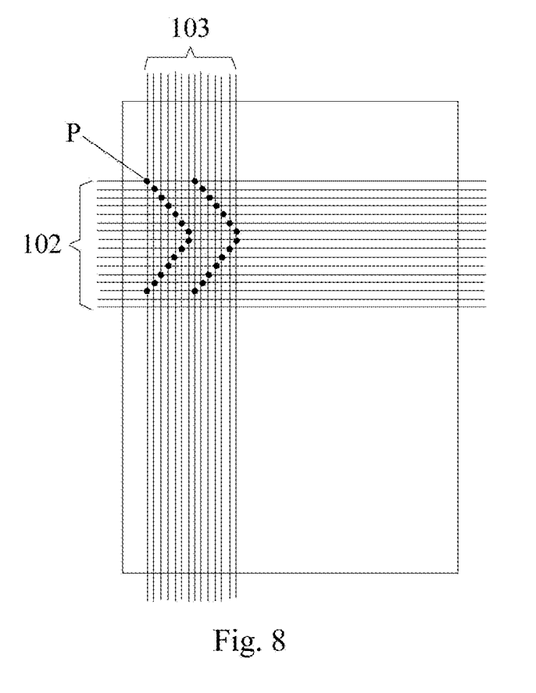
FIG. 8 is a schematic diagram of an operating state of the touch display panel according to some embodiments of the disclosure while positioning a touch.

After the system sends the fingerprint recognition request, firstly the touch position is determined so that a general touch function of the touch display panel can be performed without recognizing any fingerprint. FIG. 1 is a schematic general structural diagram of the fingerprint recognition elements above arranged in an array of 1080×1920, there are 1080 acquisition signal lines 103, 3240 data signal lines 107, and 1920 scan signal lines (i.e., control signal lines 102). In this stage, the scan signal lines (i.e., control signal lines 102) and the data signal lines 107 are operating normally, but not all the acquisition signal lines 103 are operating, but they are enabled at a specific periodicity as illustrated in FIG. 8. For example, when the first row of scan signal line (i.e., control signal line 102) is enabled, only the acquisition signal lines 103 corresponding to the $1^{st}$, $11^{th}$, $21^{st}$, $31^{st}$, ... columns operates, and the acquisition signal lines 103 of the other columns do not operate; when the second row of scan signal line (i.e., control signal line 102) is enabled, only the acquisition signal lines 103 corresponding to the $2^{nd}$, $12^{th}$, $22^{nd}$, $32^{nd}$, ... columns operates, and the acquisition signal lines 103 of the other columns do not operate; when the $10^{th}$ and $11^{th}$ rows of scan signal lines (i.e., control signal lines 102) are enabled, only the acquisition signal lines 103 corresponding to the $10^{th}$, $20^{th}$, $30^{th}$, ... columns operates, and the acquisition signal lines 103 of the other columns do not operate; when the $9^{th}$ and $12^{th}$ rows of scan signal line (i.e., control signal line 102) is enabled, only the acquisition signal lines 103 corresponding to the $9^{th}$, $19^{th}$, $29^{th}$ and other Tx columns operates, and the acquisition signal lines 103 of the other columns do not operate; and so on, where every 20 rows are cycled, thus reducing the number of IC channels, lowering the power loss of the IC, and improving the efficiency.

Figure 9:
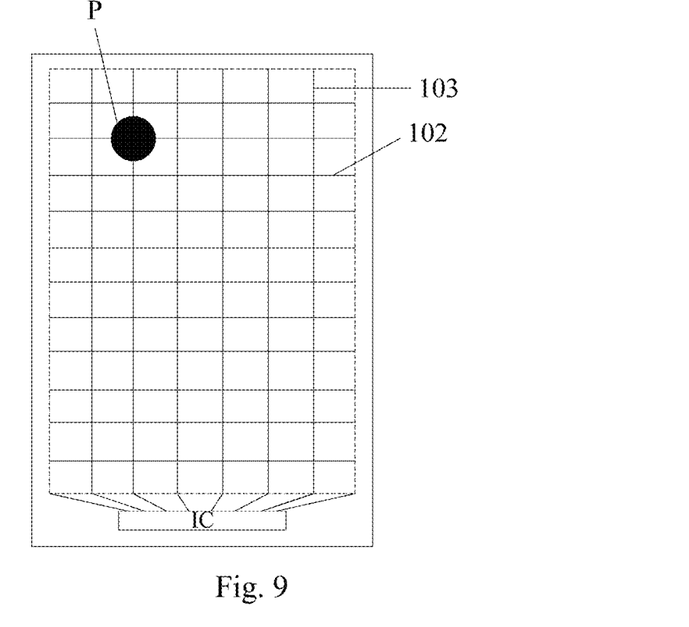
FIG. 9 is a schematic diagram of the touch display panel according to some embodiments of the disclosure while determining a touch position.
Figure 10:
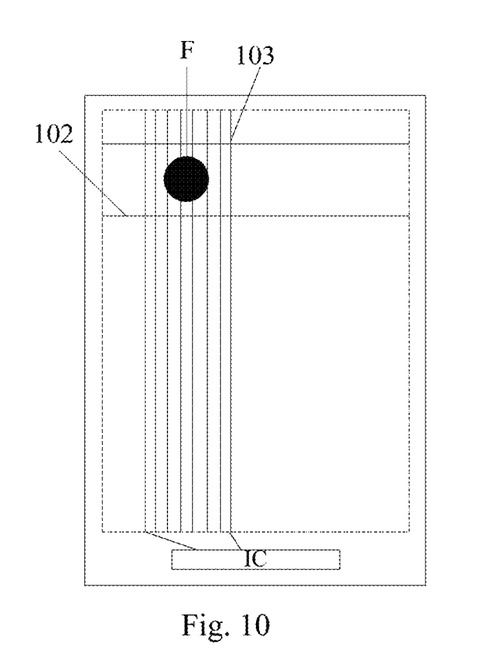
FIG. 10 is a schematic diagram of the touch display panel according to some embodiments of the disclosure while recognizing a line.

In the positioning process above, a fingerprint recognition process is performed after the touch position P of the current finger (as illustrated in FIG. 9) is determined. In the fingerprint recognition process, the acquisition signal lines 103 corresponding to the first M columns (e.g., 10 columns) and the last N columns (e.g., 10 columns) in the zone including the touch position P remain operating to thereby detect all the fingerprint information. After a frame is scanned, the fingerprint F to be recognized can be acquired as illustrated in FIG. 10. Since only a part of the acquisition signal lines 103 operates in the fingerprint recognition process, the number of IC channels can be reduced, and the power loss of the IC can be lowered.

Based upon the same inventive idea, some embodiments of the disclosure further provide a display device including the touch display panel above according to the embodiment of the disclosure. The display device can be a mobile phone, a tablet computer, a TV set, a monitor, a notebook computer, a digital photo frame, a navigator, a smart watch, a fitness wrist band, a personal digital assistant, an automatic teller machine, or any other product or component with a display function. All the other components indispensable to the display device shall readily occur to those ordinarily skilled in the art, so a repeated description thereof will be omitted here, and embodiments of the disclosure will not be limited thereto. Reference can be made to the embodiment of the touch display panel above for an implementation of the display device, so a repeated description thereof will be omitted here.

In the touch display panel, the method for driving the same, and the display device above according to the embodiments of the disclosure, the touch display panel includes: an array substrate including a plurality of pixel zones arranged in an array, a plurality of control signal lines located at gaps between respective rows of pixel zones, and a plurality of acquisition signal lines located at gaps between respective columns of pixel zones, and insulated from the control signal lines, where a plurality of sub-pixels, line recognition control transistors, and line recognition electrodes located at gaps between the respective sub-pixels are arranged in each pixel zone; the line recognition control transistors have gates connected with the control signal line, sources connected with the line recognition electrodes, and drains connected with the acquisition signal line; the control signal lines are configured to provide the line recognition control transistors with a control signal; and the acquisition signal lines are configured to provide the line recognition electrodes with a line recognition signal through the line recognition control transistors, and to receive a signal carrying line information transmitted by the line recognition electrodes through the line recognition control transistors. The line recognition control transistors, the line recognition electrodes, the acquisition signal line, and the control signal lines are integrated in the touch display panel to thereby recognize a line (e.g., a fingerprint) so as to improve a screen to panel ratio.

It should be noted that some terms, such as "first", "second", are only used for distinguishing one entity or operation from another entity or operation, but not for requiring or implying any relationship or sequence between entities or operations.

Evidently those skilled in the art can make various modifications and variations to the disclosure without departing from the spirit and scope of the disclosure. Thus the disclosure is also intended to encompass these modifications and variations thereto so long as the modifications and variations come into the scope of the claims appended to the disclosure and their equivalents.

The invention claimed is:

1. A touch display panel, comprising: an array substrate comprising a plurality of pixel zones arranged in an array, a plurality of control signal lines arranged at gaps between rows of pixel zones, and a plurality of acquisition signal lines arranged at gaps between columns of pixel zones, and insulated from the control signal lines, wherein:
a plurality of sub-pixels, line recognition control transistors, and line recognition electrodes arranged at gaps between the sub-pixels are arranged in the pixel zones, an overlap area between orthographic projections of the line recognition electrodes on the array substrate and orthographic projections of the plurality of sub-pixels on the array substrate is zero, and the line recognition control transistors have gates connected with the control signal line, sources connected with the line recognition electrodes, and drains connected with the acquisition signal line;
the control signal lines are configured to provide the line recognition control transistors with a control signal; and
the acquisition signal lines are configured to provide the line recognition electrodes with a line recognition signal through the line recognition control transistors, and to receive a signal carrying line information transmitted by the line recognition electrodes through the line recognition control transistors.

2. The touch display panel according to claim 1, wherein the line recognition electrodes comprise first sub-electrodes arranged at the gaps between the rows of sub-pixels, and second sub-electrodes arranged at gaps between the columns of sub-pixels, and electrically connected with the first sub-electrode, wherein:
one first sub-electrode is arranged at a row gap between two adjacent pixel zones, and one second sub-electrode is arranged at a column gap between two adjacent pixel zones.

3. The touch display panel according to claim 2, wherein a length of the first sub-electrode in the pixel zones is less than a sum of lengths of the sub-pixels in a row direction, and a length of the second sub-electrode is identical to a length of the sub-pixels in a column direction.

4. The touch display panel according to claim 1, further comprises scan signal lines arranged at gaps between the rows of pixel zones; and
the scan signal lines are reused as the control signal lines.

5. The touch display panel according to claim 1, further comprises data signal lines arranged at gaps between the columns of sub-pixels; and
the data signal lines are arranged at a layer same as a layer at which the acquisition signal lines are arranged, and the data signal lines and the acquisition signal lines in a same pixel zone are arranged at different gaps between columns of sub-pixels.

6. The touch display panel according to claim 1, further comprises black matrixes; and orthographic projections of the black matrixes onto the array substrate cover orthographic projections of the line recognition electrodes, the control signal lines, the acquisition signal lines, and the line recognition control transistors onto the array substrate.

7. A display device, comprising the touch display panel according to claim 1.

8. The display device according to claim 7, wherein the line recognition electrodes comprise first sub-electrodes arranged at the gaps between the rows of sub-pixels, and second sub-electrodes arranged at gaps between the columns of sub-pixels, and electrically connected with the first sub-electrode, wherein:
one first sub-electrode is arranged at a row gap between two adjacent pixel zones, and one second sub-electrode is arranged at a column gap between two adjacent pixel zones.

9. The display device according to claim 8, wherein a length of the first sub-electrode in the pixel zones is less than a sum of lengths of the sub-pixels in a row direction, and a length of the second sub-electrode is identical to a length of the sub-pixels in a column direction.

10. The display device according to claim 7, wherein the touch display panel further comprises scan signal lines arranged at gaps between the rows of pixel zones; and
the scan signal lines are reused as the control signal lines.

11. The display device according to claim 7, wherein the touch display panel further comprises data signal lines arranged at gaps between the columns of sub-pixels; and
the data signal lines are arranged at a layer same as a layer at which the acquisition signal lines are arranged, and the data signal lines and the acquisition signal lines in a same pixel zone are arranged at different gaps between columns of sub-pixels.

12. The display device according to claim 7, wherein the touch display panel further comprises black matrixes; and
orthographic projections of the black matrixes onto the array substrate cover orthographic projections of the line recognition electrodes, the control signal lines, the acquisition signal lines, and the line recognition control transistors onto the array substrate.

13. A method for driving a touch display panel, wherein the touch display panel comprises: an array substrate comprising a plurality of pixel zones arranged in an array, a plurality of control signal lines arranged at gaps between rows of pixel zones, and a plurality of acquisition signal lines arranged at gaps between columns of pixel zones, and insulated from the control signal lines, and wherein:
a plurality of sub-pixels, line recognition control transistors, and line recognition electrodes arranged at gaps between the sub-pixels are arranged in the pixel zones, an overlap area between orthographic projections of the line recognition electrodes on the array substrate and orthographic projections of the plurality of sub-pixels on the array substrate is zero, and the line recognition control transistors have gates connected with the control signal line, sources connected with the line recognition electrodes, and drains connected with the acquisition signal line;
the control signal lines are configured to provide the line recognition control transistors with a control signal; and
the acquisition signal lines are configured to provide the line recognition electrodes with a line recognition signal through the line recognition control transistors, and to receive a signal carrying line information transmitted by the line recognition electrodes through the line recognition control transistors;

the method comprising:

applying a control signal to the control signal lines line by line;

applying a line recognition signal to the line recognition electrodes through the acquisition signal lines; and detecting a feedback signal of the line recognition electrodes acquired through the acquisition signal lines to recognize a line.

14. The driving method according to claim 13, wherein the applying the line recognition signal to the line recognition electrodes through the acquisition signal lines comprises:

after the control signal is applied to one control signal line, applying the line recognition signal to the control signal line through the acquisition signal lines of a column matching with the control signal line.

15. The driving method according to claim 13, wherein the detecting the feedback signal of the line recognition electrodes acquired through the acquisition signal lines to recognize a line comprises:

detecting the feedback signal of the line recognition electrodes acquired through the acquisition signal lines, and determining a touch position;

determining acquisition signal lines to be detected again, according to the touch position;

applying a line recognition signal again to determined acquisition signal lines; and detecting a feedback signal of the determined acquisition signal lines, and recognizing a line according to a detection result.

16. The driving method according to claim 15, wherein the determining the acquisition signal lines to be detected again, according to the touch position comprises:

determining first M columns of acquisition signal lines starting with the touch position, and last N columns of acquisition signal lines succeeding to the touch position as the acquisition signal lines to be detected again, wherein M and N are positive integers.

17. The driving method according to claim 13, wherein before the control signal is applied to the control signal lines line by line, the method further comprises: receiving a fingerprint recognition request.

* * * * *